United States Patent
Park et al.

(10) Patent No.: US 7,123,644 B2
(45) Date of Patent: Oct. 17, 2006

(54) PEAK CANCELLATION APPARATUS OF BASE STATION TRANSMISSION UNIT

(75) Inventors: Won-Hyoung Park, Kyungki-Do (KR); Tae-Hyun Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 755 days.

(21) Appl. No.: 10/284,258

(22) Filed: Oct. 31, 2002

(65) Prior Publication Data

US 2003/0086480 A1    May 8, 2003

(30) Foreign Application Priority Data

Nov. 2, 2001   (KR) .................. 10-2001-0068213

(51) Int. Cl.
  H04B 15/00    (2006.01)
  H04K 1/00     (2006.01)
  H04L 27/30    (2006.01)

(52) U.S. Cl. ...................... 375/146; 375/144

(58) Field of Classification Search ............... 375/146, 375/260, 300, 320, 130, 140, 141, 285, 295, 375/296, 144; 370/210, 203
See application file for complete search history.

(56) References Cited

U.S. PATENT DOCUMENTS

| | | | |
|---|---|---|---|
| 5,204,877 A * | 4/1993 | Endo et al. ................. 375/130 |
| 6,175,551 B1 * | 1/2001 | Awater et al. .............. 370/210 |
| 6,356,606 B1 * | 3/2002 | Hahm ........................ 375/350 |
| 6,731,594 B1 * | 5/2004 | Bohnke ...................... 370/208 |
| 2002/0012405 A1 * | 1/2002 | Lee et al. ................... 375/300 |
| 2004/0052314 A1 * | 3/2004 | Copeland .................... 375/296 |
| 2004/0141548 A1 * | 7/2004 | Shattil ....................... 375/146 |

* cited by examiner

Primary Examiner—Jean B. Corrielus
(74) Attorney, Agent, or Firm—Fleshner & Kim LLP.

(57) ABSTRACT

A peak cancellation apparatus is included in a base station transmission unit to cancel the peak component of the peak signal. Thus, the base station transmission unit can be implemented with a lower capacity power amplifier. In addition, an existing power amplifier can be replaced with a low-priced power amplifier, so that an expense can be reduced. Moreover, since only the digital signal having the limited PAR is used, the degradation of the signal quality caused in conversion of the digital signal to the analog signal can be prevented. The peak cancellation apparatus includes a peak cancellation unit positioned between a multiplier and a pulse shaping filter or between the pulse shaping filter and a D/A converter and removing a peak component of the peak signal.

12 Claims, 6 Drawing Sheets

PEAK CANCELLATION APPARATUS OF BASE STATION TRANSMISSION UNIT

BACKGROUND OF THE INVENTION

1. Field of the Invention

The present invention relates to a transmission system of a base station and, more particularly, to an apparatus for improving peak-to-average ratio (PAR) characteristics of a transmission signal.

2. Description of the Background Art

A peak cancellation apparatus of a transmission unit of a base station in accordance with a conventional art will now be described with reference to the accompanying drawings.

FIG. 1 is a schematic block diagram of a transmission unit of a base station in accordance with a conventional art.

As shown in FIG. 1, the conventional base station transmission unit includes a parallel/serial converter 10 for converting parallel signals inputted from a plurality of channels to serial signals; a multiplier 20 for multiplying an output signal of the parallel/serial converter 10 and an inherent PN(Pseudo Noise) code of a base station and outputting a spread digital signal; a pulse shaping filter 30 for canceling an unnecessary signal component by limiting a band of the digital signal; D/A converter 40 for converting the digital signal outputted from the pulse shaping filter 30 into an analog signal; an I/Q modulation unit 50 for converting the analog signal into an intermediate frequency (IF) signal; an RF signal processing block 60 for converting the IF signal outputted from the I/Q modulation unit 50 into a transmittable radio frequency (RF) signal; and a power amplifier 70 for sufficiently amplifying power of the RF signal and transmitting it to a base station through an antenna.

The operation of the conventional base station transmission unit will now be described.

A pilot data and a plurality of traffic data outputted from a modem unit of a base station are coded in a coding unit (not shown) and divided into a component 'I' and a component 'Q', respectively. Passing the parallel/serial converter 10, the components 'I' are added to each other to form a channel 'I' and also the components 'Q' are added to each other to form a channel 'Q'. Thereafter, the output signal of the parallel/serial converter 10 is transmitted to the multiplier 20 by way of certain circuits. In this respect, for explanations' sake, it is assumed that the output signal of the parallel/serial converter 10 is directly transmitted to the multiplier 20.

FIG. 2 is a drawing illustrating input and output waveforms of the parallel/serial converter 10.

As shown in FIG. 2, if there are three channels (a, b, c) and if data bits of the channels a, b and c are all '1', the output signal of the parallel/serial converter 10 has a signal level of '3' at the interval t1 and the interval t2.

If the channels are increased in number, a difference between the signal level at the two intervals t1 and t2 and an average signal level widens, and due to a high peak to average ratio (PAR), an intermodulation distortion (IMD) level of the base station output signal goes up. As a result, in order to accommodate a high peak signal, the transmission unit of the base station should use a large capacity power amplifier.

When the output signal of the parallel/serial converter 10 is transmitted to the multiplier 20, the multiplier 20 performs a spreading process to multiply the output signal of the parallel/serial converter 10 by the inherent PN code of a base station. An output signal of the multiplier 10 is transmitted to the pulse shaping filter 30. The digital signal inputted to the pulse shaping filter 30 contains an unnecessary frequency component as well as a desired frequency band and has a wider channel width than a desired band width. Thus, the pulse shaping filter 30 cancels the unnecessary signal component by limiting the band of the input signal.

The output signal of the pulse shaping filter 30 is converted into an analog signal in the digital/analog converter 40 and transmitted to the I/Q modulation unit 50. Upon receiving the analog signal, the I/Q modulation unit 50 converts it into an intermediate frequency (IF) signal.

The IF signal outputted from the I/Q modulation unit 50 is converted into a transmittable radio frequency signal while passing the RF signal processing block 60, and transmitted to the power amplifier 70.

The power amplifier 70 sufficiently amplifies the power of the received RF signal and wirelessly transmits it to a base station through the antenna.

Therefore, as mentioned above, the transmission unit of a base station in accordance with the conventional art has the following problems.

That is, in designing a system related to the PAR characteristics, the system should be designed to have a sufficient margin for a gain of the power amplifier, and in addition, use of the relatively many high-priced amplifier modules incurs unnecessary expense.

Moreover, the increase in the number of channels in the mobile communication base station system leads to occurrence of many peak signals in view of the channelization code, which inevitably degrades the performance of the overall system.

Furthermore, the high PAR causes an increase in the nonlinearity of the power amplifier and worsens the intermodulation characteristics of the base station output spectrum, degrading the transmission performance of the base station.

The above references are incorporated by reference herein where appropriate for appropriate teachings of additional or alternative details, features and/or technical background.

SUMMARY OF THE INVENTION

Therefore, an object of the present invention is to provide a peak cancellation apparatus of a transmission unit of a base station that is capable of improving PAR characteristics of a transmission signal of a mobile communication system.

To achieve at least the above objects in whole or in parts, there is provided a peak cancellation apparatus of a transmission unit of a base station including: a parallel/serial converter for converting parallel signals inputted from a plurality of channels into serial signals; a multiplier for multiplying an output signal of the parallel/serial converter by a PN code; a pulse shaping filter for shaping a pulse of the signal outputted from the multiplier; a D/A converter for converting the shaped signal into an analog signal; and a peak cancellation unit positioned between the multiplier and the pulse shaping filter or between the pulse shaping filter and the D/A converter and canceling a peak component of a peak signal.

In the peak cancellation apparatus of a transmission unit of a base station of the present invention, the peak cancellation unit includes a delay for delaying an inputted digital signal for a predetermined time and outputting it; a peak detector for detecting a peak signal from a signal inputted to the delay and outputting a peak value; a comparator for receiving the peak value and a predetermined threshold value and outputting a difference value between the two values; and a peak canceler for canceling the peak component contained in the output signal of the delay with reference to the output signal of the comparator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
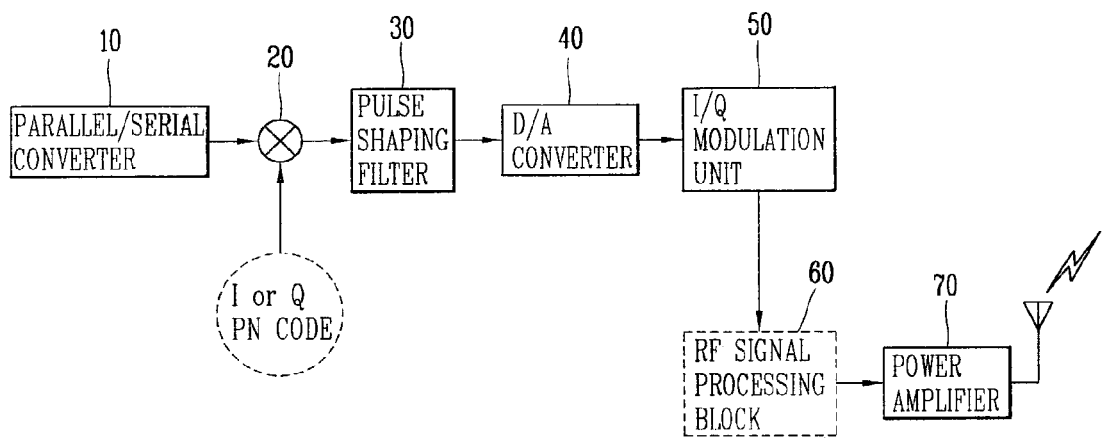
FIG. 1 is a block diagram of a transmission unit of a base station in accordance with a conventional art.
Figure 2:
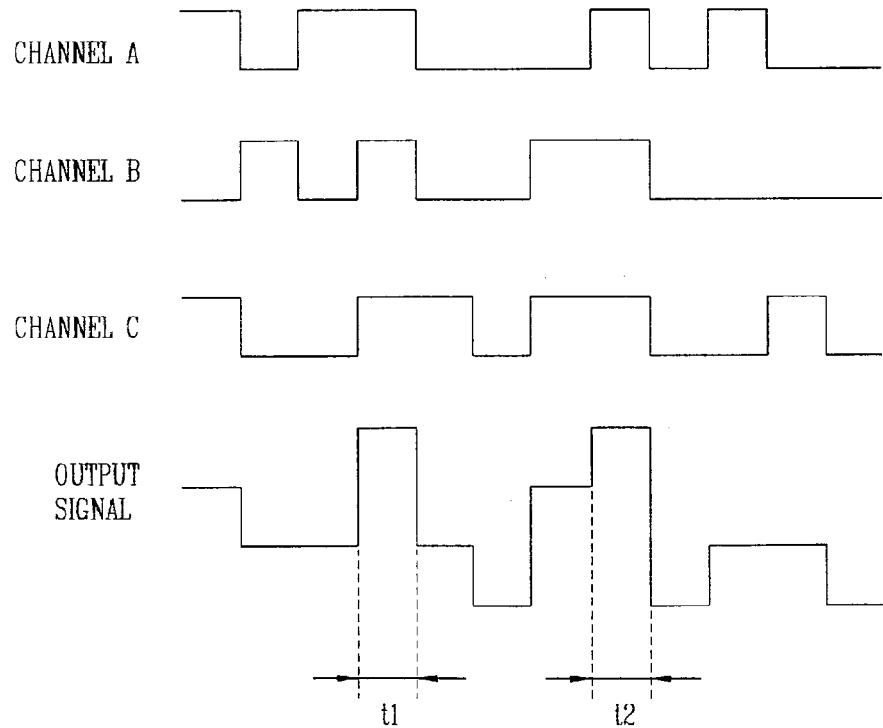
FIG. 2 is a drawing illustrating input/output waveforms of a parallel/serial converter.
Figure 3:
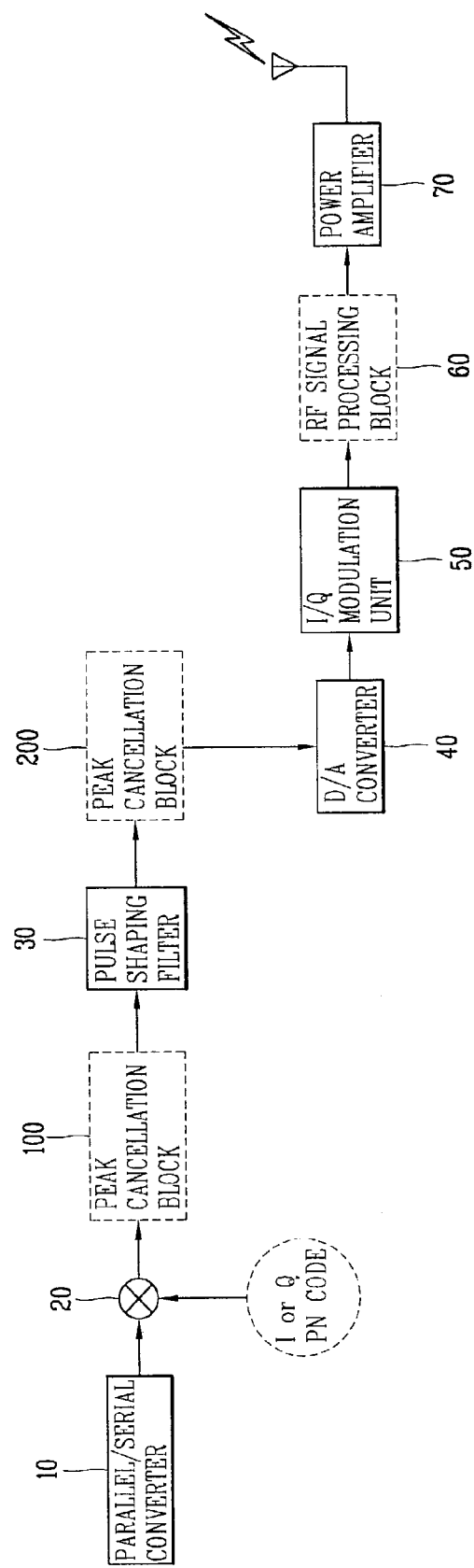
FIG. 3 is a block diagram of a transmission unit of a base station in accordance with the present invention.

FIG. 3 is a block diagram of a transmission unit of a base station in accordance with the present invention.

As shown in FIG. 3, a peak cancellation apparatus of a transmission unit of a base station includes: a parallel/serial converter 10 for converting parallel signals inputted from a plurality of channels into serial signals; a multiplier 20 for multiplying an output signal of the parallel/serial converter 10 by a PN code; a pulse shaping filter 30 for shaping a pulse of the signal outputted from the multiplier 20; a D/A converter 40 for converting the shaped signal into an analog signal; and a peak cancellation unit 100 or 200 positioned between the multiplier 20 and the pulse shaping filter 30 or between the pulse shaping filter 30 and the D/A converter 40 and canceling a peak component of a peak signal.

The peak signal signifies a digital signal having a signal level greater than a reference value (or a threshold value), and the peak value signifies a signal level of the peak signal. The peak component signifies a component exceeding the reference value in the peak signal.

The pulse shaping filter 30 is constructed as a finite impulse filter (FIR).

The first embodiment of the present invention in which the peak cancellation unit 100 is inserted between the multiplier 20 and the pulse shaping filter 30 will now be described.

Figure 4:
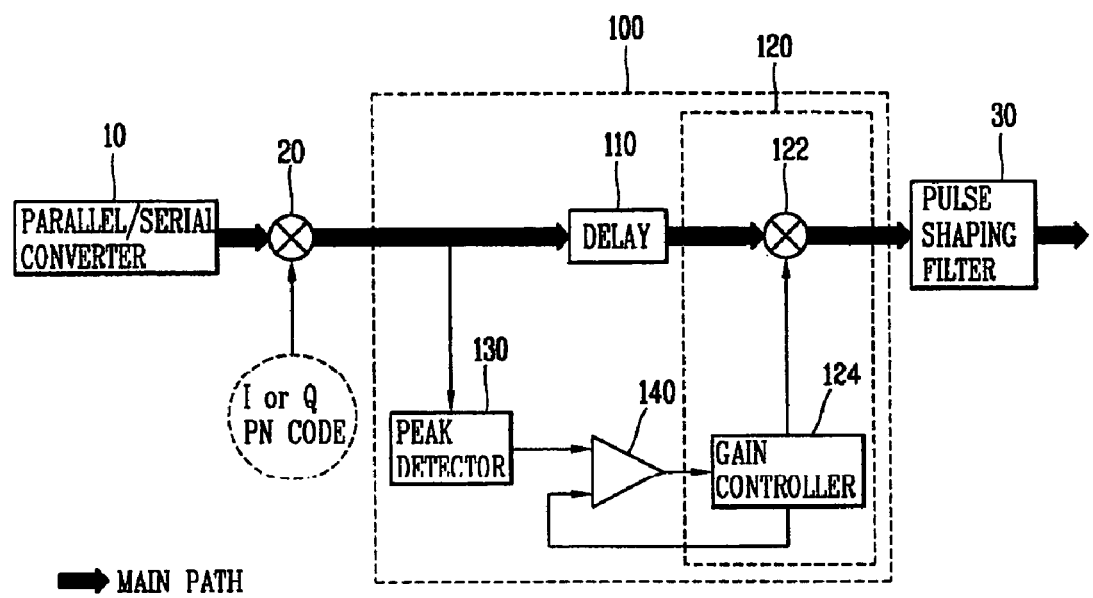
FIG. 4 is a detailed block diagram of the transmission unit of a base station in accordance with a first embodiment of the present invention.

FIG. 4 is a detailed block diagram of the base station transmission unit in accordance with the first embodiment of the present invention.

As shown in FIG. 4, the peak cancellation unit 100 includes a delay 110 for delaying an inputted digital signal for a predetermined time and outputting it; a peak detector 130 for detecting a peak signal from a signal inputted to the delay 110 and outputting a peak value; a comparator 140 for receiving the peak value and a predetermined threshold value and outputting a difference value between the two values; and a peak canceler 120 for canceling the peak component contained in the output signal of the delay 110 with reference to the output signal of the comparator 140.

The peak canceler 120 includes a gain controller 124 for generating a gain control signal with reference to the output signal of the comparator 140; and a gain scaler 122 for attenuating a gain of the output signal of the delay 110 containing the peak component according to the gain control signal.

The operation of the peak cancellation unit 100 will now be described.

The digital signal outputted from the parallel/serial converter 20 is multiplied by an inherent PN code of a base station and converted into a signal (signal 'I' or signal 'Q') having a data rate of a chipx 1. The converted digital signal is inputted to the delay 110.

The delay 110 delays the signal so that the signal inputted from the multiplier 30 to the gain scaler 122 can correspond to the control signal of the gain controller 124. If transmission timings of the two signals are not identical to each other, the gain controller 124 will reduce the gain of the digital signal, which causes degradation of a signal quality of the base station.

The peak detector 130 detects a peak signal from the digital signal transmitted to the delay 110 and outputs a peak value of the detected signal to the comparator 140. The comparator 140 receives the peak value by one input terminal thereof and a threshold value by the other input terminal, and compares the two values. The threshold value is generated by the gain controller 124.

The output signal of the comparator 140 is a difference between the two values and transmitted to the gain controller 124.

The gain controller 124 controls the gain scaler 122 to cancel the peak component of the corresponding signal with reference to the output signal of the comparator 140. That is, the gain scaler 122 lowers down the gain of the peak signal according to the control signal of the gain controller 124, in order to take down the peak value to the threshold value.

Figure 6A:
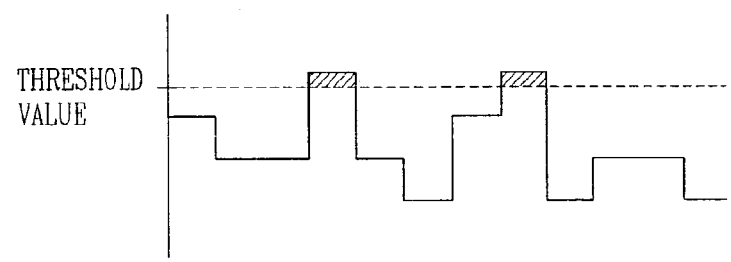
FIGS. 6A through 6C are drawings illustrating waveforms outputted from each element of a peak cancellation unit (100)
Figure 6B:
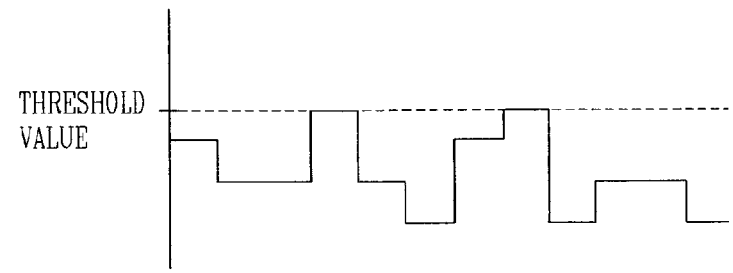
Figure 6C:
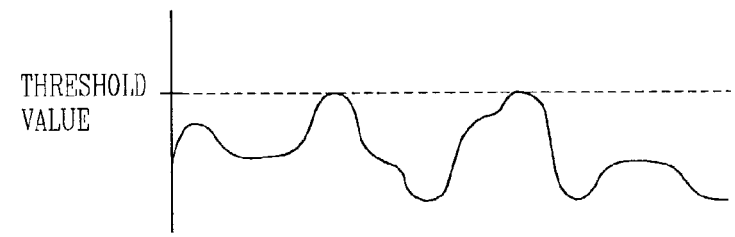

FIGS. 6A through 6C are drawings illustrating waveforms outputted from each element of the peak cancellation unit 100.

FIG. 6A shows a waveform inputted to the peak cancellation unit 100, FIG. B shows an output waveform of the peak cancellation unit 100, and FIG. 6C shows an output waveform of the pulse shaping filter 30.

The second embodiment of the present invention in which the peak cancellation unit 200 is inserted between the pulse shaping filter 30 and the D/A converter 40.

Figure 5:
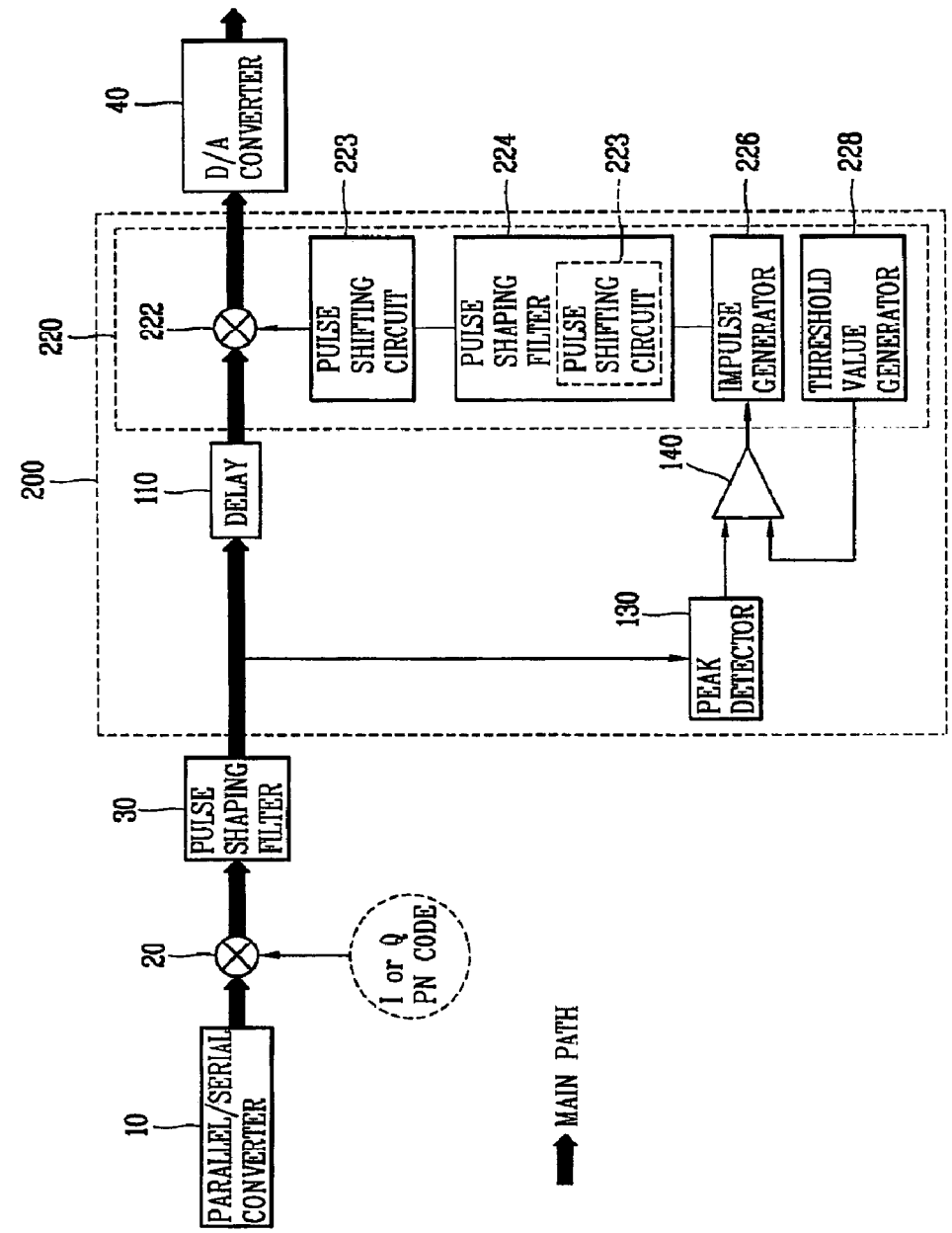
FIG. 5 is a detailed block diagram of a transmission unit of a mobile communication in accordance with a second embodiment of the present invention.

FIG. 5 is a detailed block diagram of a mobile communication transmission unit in accordance with the second embodiment of the present invention.

As shown in FIG. 5, the peak cancellation unit 200 includes: a delay 110 for delaying an inputted digital signal for a predetermined time and outputting it; a peak detector 130 for detecting a peak signal from the signal inputted to the delay 110 and outputting a peak value; a comparator 140 for receiving the peak value and a predetermined threshold value and outputting a difference value between the two values; and a peak canceler 220 for canceling a peak component contained in the output signal of the delay with reference to the output signal of the comparator 140.

The peak canceler 220 includes a threshold value generator 228 for outputting the predetermined threshold value to the comparator 140; an impulse generator 226 for generating an impulse signal with a size as large as that of the output signal of the comparator 140; a pulse shaping filter 224 for shaping a pulse width of the generated impulse signal; and an adder 222 for adding the output signal of the delay 110 and an inverse-phase output signal of the pulse shaping filter 224.

When a peak signal is detected, the peak cancellation unit 220 cancels the peak component of the corresponding signal by using an inverse-phase signal of the signal proportional to the difference between the peak value of the detected signal and the threshold value.

For this purpose, first, a signal of a phase proportional to the difference between the peak value of the detected signal and the threshold value is to be generated, and the same pulse shaping filter as being used on a main path should be included in the peak cancellation unit 200. In order to effectively cancel the peak component, the pulse shaping filter of the peak cancellation unit 200 needs to be the same as the filter used on the main path. The main path, a basic path for a signal transmission in the base station transmission unit, signifies a path connected from the parallel/serial converter 10, the multiplier 20, the pulse shaping filter 30, the D/A converter 40 to an antenna.

The operation of the peak cancellation unit 200 will now be described in detail.

The digital signal outputted from the parallel/serial converter 10 is multiplied by the inherent PN code of the base station and inputted to the delay 110 through the pulse shaping filter 30.

The peak detector 130 detects a peak signal from the digital signal transmitted to the delay 110 and outputs a peak value of the detected signal to the comparator 140. Then, the comparator 140 receives the peak value by one terminal thereof and the threshold value by the other input terminal, and compares the two values. The threshold value is generated by the threshold value generator 228.

The output signal of the comparator 140 is transmitted to the impulse generator 226.

The impulse generator 226 generates an impulse signal (discrete digital signal) with a size as large as that of the output signal of the comparator 140 and outputs it to the filter 224. Then, the filter 224 adjusts the width of the impulse signal to be the same as the width of the signal transmitted on the main path and outputs it to the adder 222. The filter 224 is a pulse shaping filter, the same as the filter 30 on the main path, making the width of an inputted signal to be the same as the width of a signal transmitted on the main path.

As the output signal of the filter 224 is inputted to the adder 222, the phase is changed to be inverse by a phase shifting circuit 223 located either within filter 224 or between filter 224 and adder 222.

The adder 222 adds the digital signal (the normal phase) delayed for a predetermined time by the delay 110 and the signal (the inverse-phase) inputted from the filter 224, whereby the peak component of the detected peak signal is canceled.

FIGS. 7A through 7E are drawings illustrating waveforms outputted from each element of the peak cancellation unit 200.

Figure 7A:
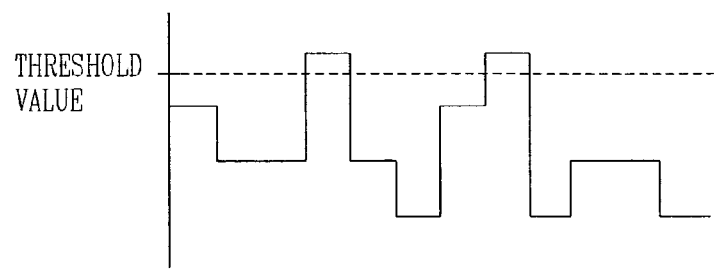
FIGS. 7A through 7E are drawings illustrating waveforms outputted from each element of a peak cancellation unit (200).
Figure 7B:
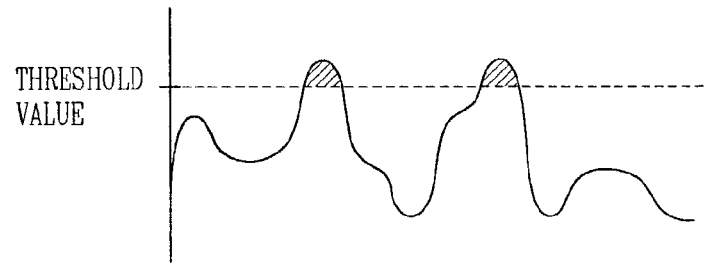
Figure 7C:
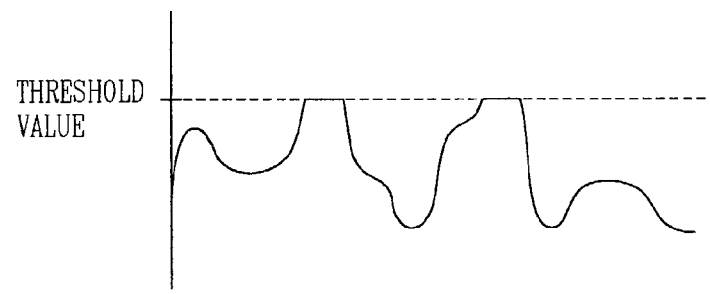
Figure 7D:
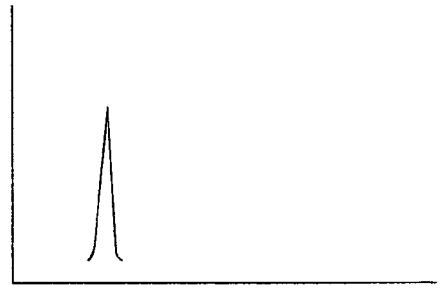
Figure 7E:
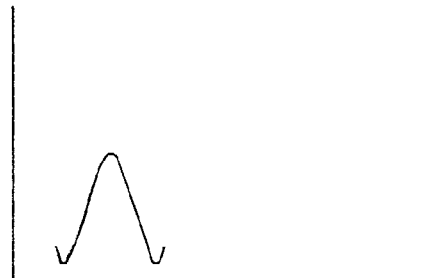

FIG. 7A shows a waveform inputted to the pulse shaping filter 30, FIG. 7B shows an output waveform of the pulse shaping filter 30, FIG. 7C shows an output waveform of the adder 222, FIG. 7D shows a sample of a signal generated by the impulse generator 226, and FIG. 7E shows a sample of a signal outputted from the filter 224.

In the embodiments 1 and 2, when the size of the threshold value is determined, EVM (Error Vector Magnitude) and an ACPR (Adjacent-Channel Power Rejection) are variables to be taken into account. These two values are the reference in determining a threshold value and has a complimentary relation to each other.

As so far described, the peak cancellation apparatus of the present invention has the following advantages.

That is, since the peak cancellation apparatus is included in the base station transmission unit to cancel the peak component of the peak signal, the base station transmission unit can be implemented with a lower capacity power amplifier. In addition, the existing power amplifier can be replaced with a low-priced power amplifier, an expense can be reduced. Moreover, since only the digital signal having the limited PAR is used, the degradation of the signal quality caused in conversion of the digital signal to the analog signal can be prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A peak cancellation apparatus of a transmission unit of a base station comprising:
   a parallel/serial converter for converting parallel signals inputted from a plurality of channels into serial signals;
   a multiplier for multiplying an output signal of the parallel/serial converter by a PN code;
   a first pulse shaping filter for shaping a pulse of the signal outputted from the multiplier;
   a D/A converter for converting the shaped signal into an analog signal; and
   a peak cancellation circuit, which is positioned between the first pulse shaping filter and the D/A converter, to cancel a peak component of a peak signal received from the first pulse shaping filter, the peak cancellation circuit including:
   a peak detector to detect the peak signal from the first pulse shaping filter,
   an impulse generator to generate an impulse signal based on the peak signal, and
   a second pulse shaping filter to adjust a width of the impulse signal to at least substantially correspond to a width of a main path signal of the transmission unit, the peak component of the peak signal being canceled based on the impulse signal output from the second pulse shaping filter.

2. The apparatus of claim 1, wherein the peak cancellation circuit further comprises:
   a delay for delaying an inputted digital signal for a predetermined time and outputting the delayed signal, the peak detector detecting the peak signal from the signal inputted to the delay and outputting a peak value; and a comparator for receiving the peak value and a predetermined threshold value and outputting a difference value between the two values, wherein the impulse generator generates said impulse signal based on the difference value.

3. The apparatus of claim 1, wherein the impulse signal output from the second pulse shaping filter has the same pulse width as the output signal of the first pulse shaping filter.

4. The apparatus of claim 1, wherein the first pulse shaping filter is at least substantially the same as the second pulse shaping filter.

5. The apparatus of claim 1, further comprising:
a phase shifting circuit to inverse a phase of the impulse signal shaped by the second pulse shaping circuit; and
an adder to add the pulse output from the first pulse shaping circuit and the inverse-phase impulse signal output from the phase shifting circuit, to cancel the peak component of the peak signal.

6. The apparatus of claim 5, wherein the inverse-phase impulse signal has a size proportional to a difference between the peak value detected by the detector and a threshold value set based on a desired corrected peak-to-average ratio.

7. The apparatus of claim 5, wherein the second pulse shaping filter includes the phase shifting circuit.

8. The apparatus of claim 2, wherein the impulse generator generates the impulse signal to have a size at least substantially equal to an output signal of the comparator.

9. A peak cancellation apparatus of a base station transmission unit comprising:
a multiplier for spreading a parallel/serial-converted signal;
a first filter for shaping a pulse of a signal outputted from the multiplier;
a D/A converter for converting the shaped signal into an analog signal; and
a peak cancellation circuit, positioned between the first filter and the D/A converter, to remove a peak component of a peak signal received from the first filter, the peak cancellation circuit removing said peak component based on an impulse signal having a width at least substantially equal to a width of and a phase which is at least substantially inverse to a phase of the pulse signal output from the first filter.

10. The apparatus of claim 9, wherein the peak cancellation circuit unit comprises:
a delay for delaying an inputted digital signal for a predetermined time and outputting a delayed signal;
a peak detector for detecting the peak signal from the signal inputted to the delay and outputting a peak value;
a comparator for receiving the peak value and a predetermined threshold value and outputting a difference value between the two values;
a threshold value generator for outputting the predetermined threshold value to the comparator;
an impulse generator for receiving an output signal of the comparator and generating the impulse signal with a size as large as that of the inputted signal;
a second filter for shaping a pulse width of the generated impulse signal; and
an adder for adding an output signal of the delay and an inverse-phase signal of an output signal of the second filter and outputting the added signal to the D/A converter.

11. The apparatus of claim 10, wherein the output signal of the second filter has the same pulse width with the output signal of the first filter.

12. The apparatus of claim 10, wherein the first filter and the second filter have substantially the same pulse shaping parameters.

* * * * *